(12) United States Patent
Jinkins et al.

(10) Patent No.: US 11,052,582 B1
(45) Date of Patent: Jul. 6, 2021

(54) COLLAPSIBLE CORE DEVICES AND METHOD FOR INJECTION MOLDING

(71) Applicant: Versevo Inc., Hartland, WI (US)

(72) Inventors: Barry Jinkins, Eagle, WI (US); Donald Lee, Oconomowoc, WI (US)

(73) Assignee: Versevo, Inc., Hartland, WI (US)

(*) Notice: Subject to any disclaimer, the term of this patent is extended or adjusted under 35 U.S.C. 154(b) by 0 days.

(21) Appl. No.: 16/397,586

(22) Filed: Apr. 29, 2019

Related U.S. Application Data

(60) Provisional application No. 62/666,019, filed on May 2, 2018.

(51) Int. Cl.
*B29C 44/58* (2006.01)
*B29C 45/44* (2006.01)

(52) U.S. Cl.
CPC ........ *B29C 44/582* (2013.01); *B29C 45/4421* (2013.01)

(58) Field of Classification Search
CPC .... B29C 2045/4492; B29C 2045/4485; B29C 45/4435; B29C 45/44; B29C 44/582; B29C 45/4421
USPC .................................................. 425/DIG. 58
See application file for complete search history.

(56) References Cited

U.S. PATENT DOCUMENTS

| | | | | |
|---|---|---|---|---|
| 2,583,093 A * | 1/1952 | Emmert | ........... | B29C 45/44 425/556 |
| 3,584,111 A * | 6/1971 | Allison | ........... | B29C 45/44 264/318 |
| 3,718,419 A * | 2/1973 | Adamo | ........... | B29C 45/2681 425/438 |
| 3,730,664 A * | 5/1973 | Hultgren | ........... | B29C 33/485 425/338 |
| 3,737,277 A * | 6/1973 | Uhlig | ........... | B29C 33/485 425/438 |
| 4,383,819 A * | 5/1983 | Letica | ........... | B29C 45/33 249/144 |
| 4,519,569 A * | 5/1985 | Nolan | ........... | B29C 45/44 249/142 |
| 5,494,434 A * | 2/1996 | Schwaiger | ........... | B29C 45/4421 425/577 |
| 5,788,911 A * | 8/1998 | Nomura | ........... | B29C 45/2618 264/318 |
| 5,922,368 A * | 7/1999 | Murphy | ........... | B29C 45/4421 264/318 |
| 6,079,973 A * | 6/2000 | Manera | ........... | B29C 45/2681 264/318 |

(Continued)

*Primary Examiner* — Xiao S Zhao
*Assistant Examiner* — Emmanuel S Luk
(74) *Attorney, Agent, or Firm* — Anthony J. Bourget

(57) ABSTRACT

Collapsible core devices, related methods and injection molding tools for use in injection molding processes, the core device configured to collapse upon rotation of a centrally disposed rotating shaft. In some aspects the core device includes a rotatable shaft, moveable outer wall components positioned radially from the shaft, a first disk operatively engaged with the shaft and having at least a first slot configured to receive a first pin connected to a moveable outer wall component, and a second disk secured in a fixed position and having at least a second slot configured to receive the first pin, such that rotation of the rotatable shaft causes the pin to slide within the second slot toward the shaft and causing the outer wall component to move toward the shaft.

16 Claims, 20 Drawing Sheets

(56) References Cited

U.S. PATENT DOCUMENTS

| | | | | |
|---|---|---|---|---|
| 6,386,852 B1* | 5/2002 | Berdan | ............... | B29C 45/1734 |
| | | | | 264/572 |
| 6,432,350 B1* | 8/2002 | Seres | .................... | B29C 45/174 |
| | | | | 264/500 |
| 6,506,330 B1* | 1/2003 | Schweigert | ......... | B29C 45/4421 |
| | | | | 249/59 |
| 6,655,952 B1* | 12/2003 | Kraft | .................... | B29C 45/4435 |
| | | | | 264/318 |
| 7,157,037 B2* | 1/2007 | Seidelman | ............ | B29C 45/262 |
| | | | | 249/59 |
| 7,381,046 B2* | 6/2008 | Kuo | ........................ | A45D 40/16 |
| | | | | 425/443 |
| 8,002,538 B2* | 8/2011 | Zydron | ............... | B29C 45/4421 |
| | | | | 425/417 |
| 9,011,138 B2* | 4/2015 | Hickok | ............... | B29C 45/4421 |
| | | | | 425/556 |
| 2010/0323051 A1* | 12/2010 | Helenius | ................. | B29C 33/76 |
| | | | | 425/161 |
| 2011/0151049 A1* | 6/2011 | Muller | ................ | B29C 45/4421 |
| | | | | 425/577 |
| 2013/0071509 A1* | 3/2013 | Antonana Gastesi | ........................ | |
| | | | | B29C 45/2669 |
| | | | | 425/470 |
| 2013/0260080 A1* | 10/2013 | Roberts | ............... | B29C 44/0461 |
| | | | | 428/71 |
| 2014/0212610 A1* | 7/2014 | Arai | .................... | B29C 44/0415 |
| | | | | 428/36.5 |
| 2016/0107356 A1* | 4/2016 | Seelhorst | ............ | B29C 45/2622 |
| | | | | 425/556 |

* cited by examiner

COLLAPSIBLE CORE DEVICES AND METHOD FOR INJECTION MOLDING

CROSS-REFERENCE TO RELATED APPLICATIONS

This application claims the benefit and priority of Provisional Patent Application Ser. No. 62/666,019, filed May 2, 2018 for Collapsible Core Devices for Injection Molding, incorporated herein by reference in its entirety for continuity of disclosure.

BACKGROUND OF THE INVENTION

1. Field of the Invention

This invention relates to the field of collapsible core devices for injection molding processes, and to collapsible core devices for use in injection molding of articles having an undercut feature.

2. Background Information

Injection molding processes often utilize an inner core in conjunction with outer mold structures to create a formed article. In some cases the formed article includes an undercut (or overcut) feature which is narrow compared to remaining features of the article. Because of such narrow or undercut features, the core device is not able to be extracted from the formed article by simple linear translation of the mold from the article (or simple linear ejection of the article from the core and mold). For instance, the article will have a narrowing feature or undercut which inhibits simple retraction of the core because at least one portion of the core has a dimension wider than the undercut of the article. Prior devices therefore use a collapsible core to resize (i.e., make smaller in many cases) the core so that it may be extracted from the article (or to eject the article from the core). There have been a variety of devices and systems used to collapse a core of a mold in an injection molding process, such as devices shown in U.S. Pat. Nos. 9,579,836 and 9,808,975 and US Patent Publication No. 2009/0152770. While these and other devices or systems may have benefits, there is room for improvement.

SUMMARY OF THE INVENTION

The present invention pertains to a collapsible core device for use in an injection molding process where the core device is collapsed by use of rotary action. Particularly, rotation of a shaft within the core device causes at least one outer wall component of the core to move centripetally (i.e., in one instance, linearly toward the rotating shaft). The centripetal action causes the core device to decrease in relative size compared to the formed article so that the core device may be removed from the article (or the article removed from the core device). In one aspect the invention includes means for linear movement of an outer component of a core device by rotary actuation of a shaft within the core device. In a further aspect the invention includes an injection molding tool utilizing the core device as described.

In a further aspect the invention includes a collapsible core device for use in a molding process, the core device having a rotatable shaft, a first moveable outer wall component positioned radially from the rotatable shaft and configured to insert into an outer mold structure of a molding tool to create a molded article, a first disk operatively engaged with the rotatable shaft and having at least a first slot, the at least a first slot configured to receive a first pin connected to the first moveable outer wall component, and a second disk secured in a fixed position and having at least a second slot configured to receive the first pin, the rotatable shaft configured to rotate such that rotation of the rotatable shaft causes the pin to slide within the at least a second slot toward the rotatable shaft and causing the first moveable outer wall component to move toward the rotatable shaft. In further aspects the device includes multiple outer wall components which are moveable at different rates according to the various slot paths formed in the disks which rotate with the rotatable shaft. In one aspect the rates of motion of pins within the slots is variable as the rotating shaft rotates at a constant, and in further aspects the rates of motion of pins within the slots is continuously variable.

In a further aspect the invention includes a method for retracting a core device of an injection mold tool from a formed article utilizing the core device as described. In one aspect the method includes the step of rotating a central shaft to centripetally move outer wall components of the core device toward the rotating shaft.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
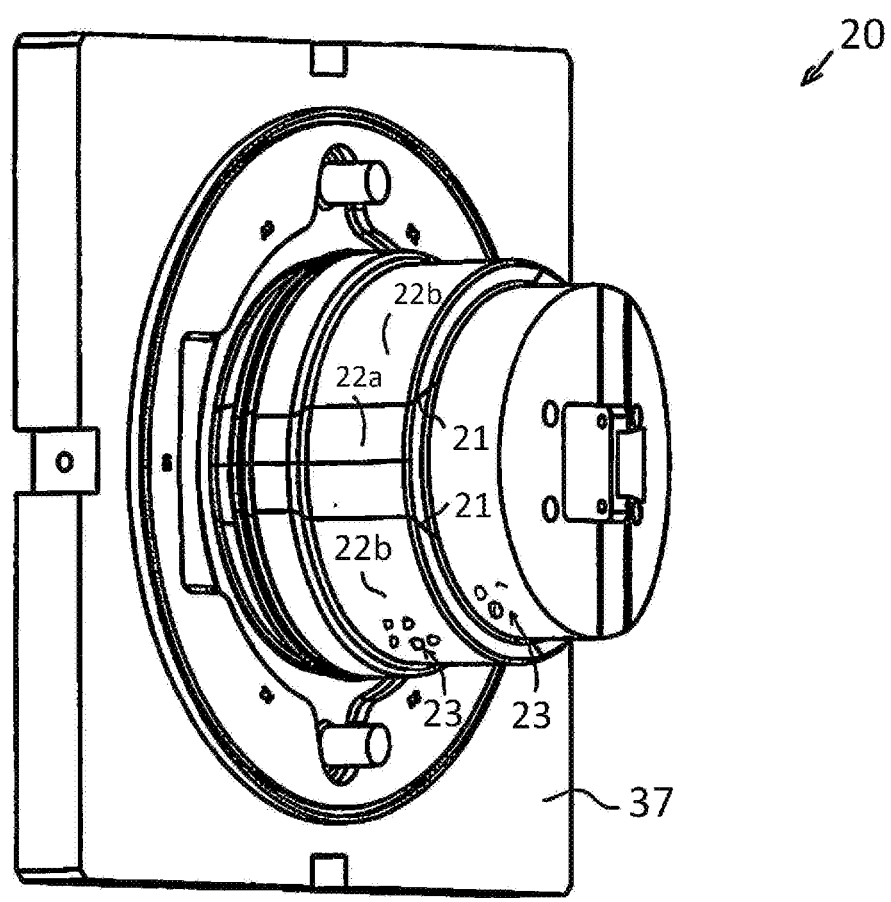
FIG. 1 is a perspective view of a core device in accordance with the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Figure 2:
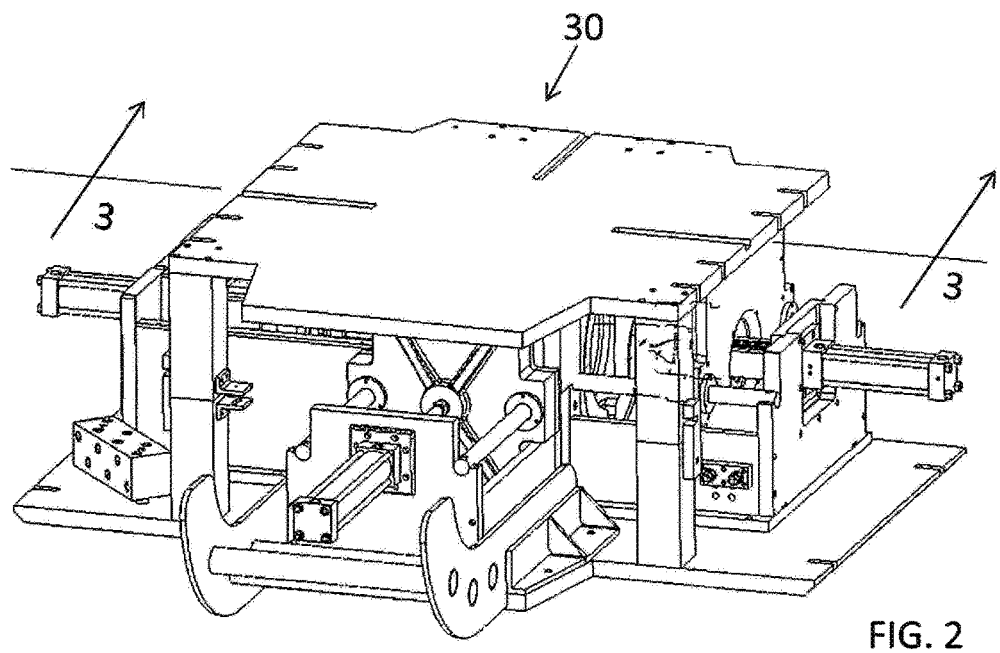
FIG. 2 is an injection molding tool in accordance with a further aspect of the present invention and including the core device of FIG. 1.
Figure 3:
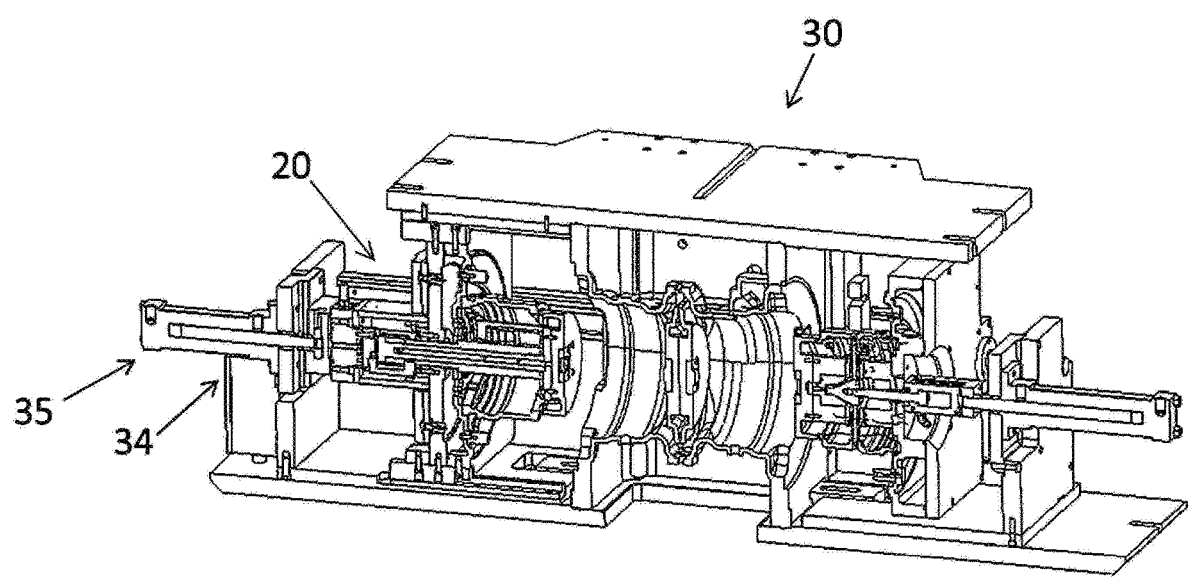
FIG. 3 is a perspective section view taken along line 3-3 of FIG. 2 and showing the core device of FIG. 1.
Figure 4:
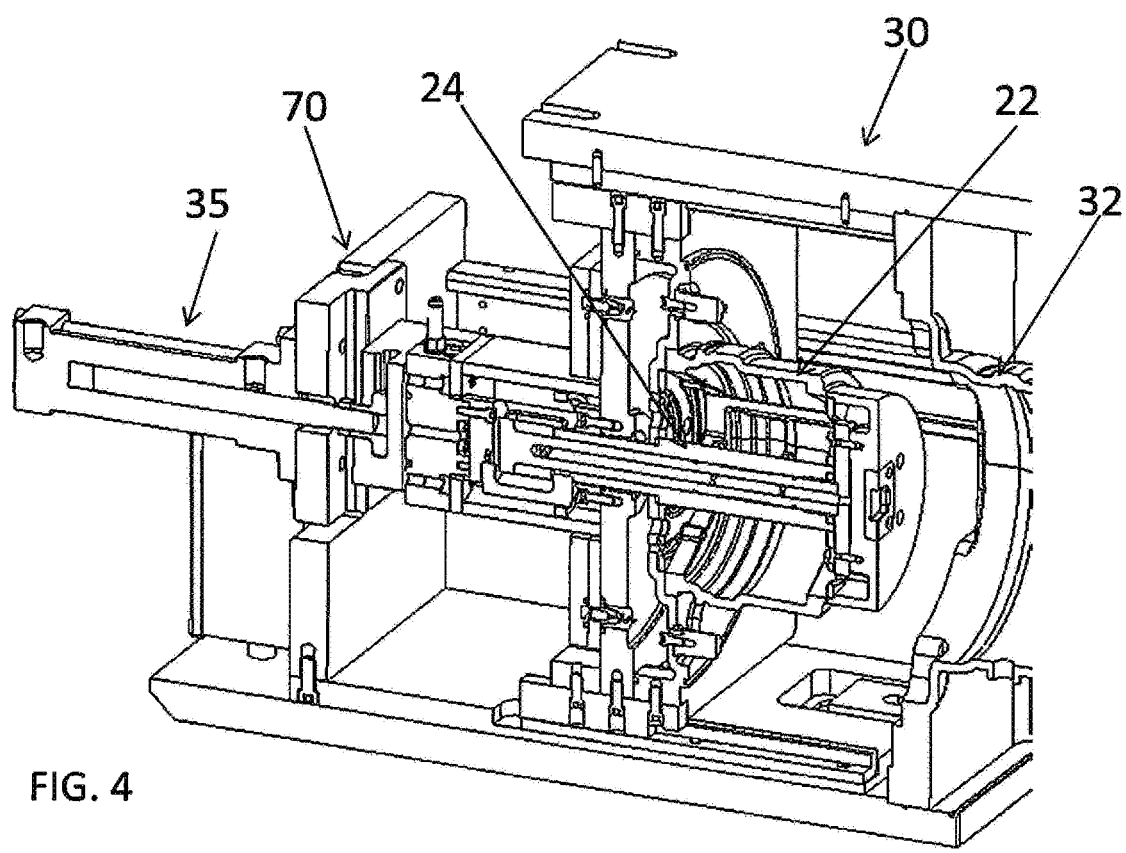
FIG. 4 is a partial enhanced view of the molding tool and core device shown in FIG. 3.
Figure 5:
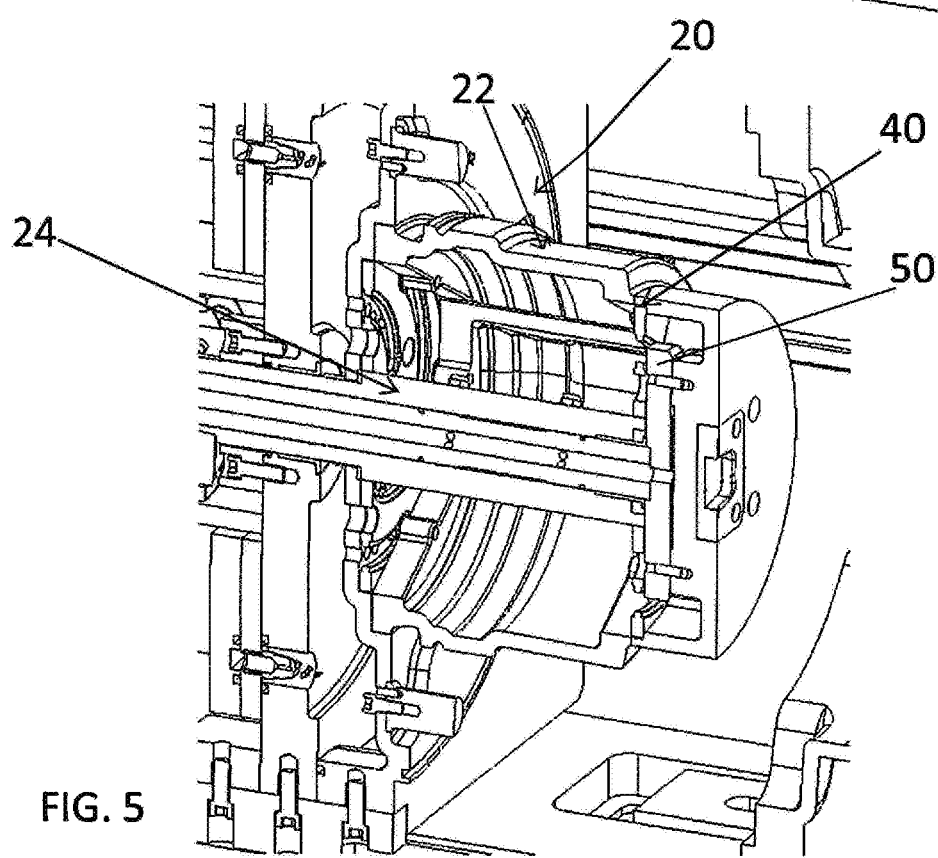
FIG. 5 is a partial enhanced view of the molding tool and core device shown in FIG. 3.

Referring to FIGS. 1-26, the core device and injection molding tool aspects of the present invention are shown. Core device 20 is configured for use within tool 30. Device 20 is positionable in or upon a sliding mechanism 34 which slides within tool 30 by use of a cylinder 35. Core device 20 is configured to insert within an outer mold structure 32 (See FIG. 4) to comprise parts of an injection mold into which is received foam particles which are heated and expanded to form a desired foam article in the shape of the mold. The core device 20 is configured to collapse so that device 20 may be extracted from the outer mold structure 32 and the resulting foam article. FIG. 2 and FIG. 3 depict a tool 30 having multiple core inserts to form a molded piece. The right hand side of tool 30 depicts a prior art collapsible core device while the left hand side depicts the core device 20. Multiple core devices 20 may be utilized in a tool 30. FIG. 22 shows a representative foam article 58 having an undercut geometry feature 59 made in accordance with the invention. The undercut 59 prevents wall component 22 from being able to retract from article 58 by sliding longitudinally. Instead, core device 20 collapses to allow clearance for wall components 22 to pass.

Figure 6:
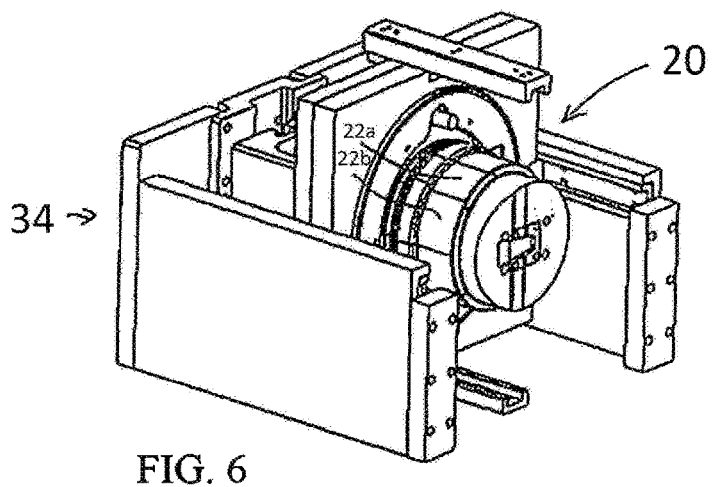
FIG. 6 is a perspective view of the core device of FIG. 1 in conjunction with a slide mechanism.
Figure 7:
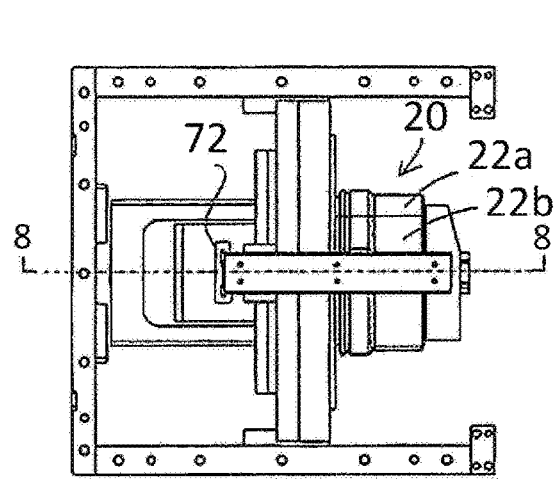
FIG. 7 is a top view of the core device of FIG. 6.
Figure 8:
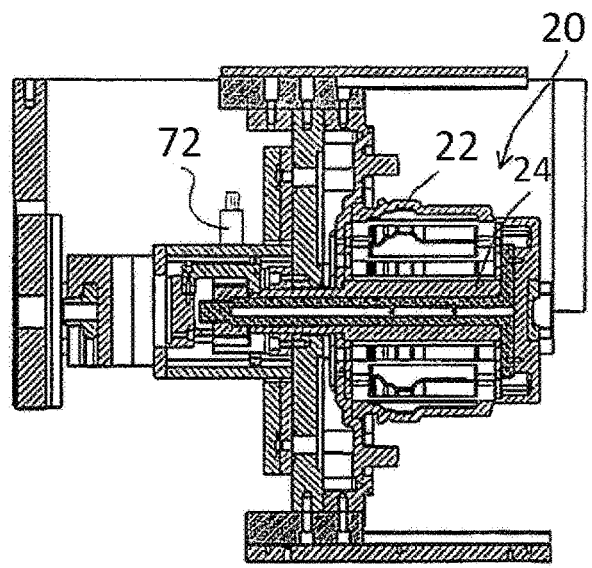
FIG. 8 is a section view taken along line 8-8 of FIG. 7.

FIGS. 6-8 show device 20 positioned on or within a sliding mechanism 34 for insertion into tool 30. After article 58 has sufficiently cooled, wall components are collapsed and thus separate from article 58. After wall components 22 are collapsed, sliding mechanism 34 is activated to slide core device 20 from article 58. The tool 30 and core device 20 may then be utilized for another injection molding operation to create another article 58.

Figure 9:
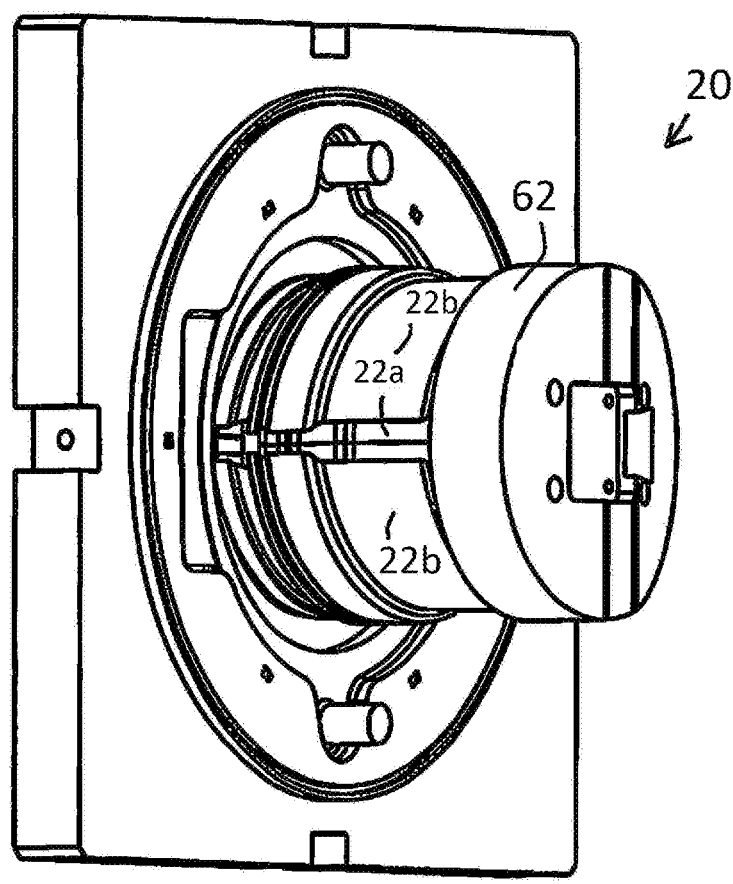
FIG. 9 is a perspective view of the core device of FIG. 1 in a collapsed mode.
Figure 10:
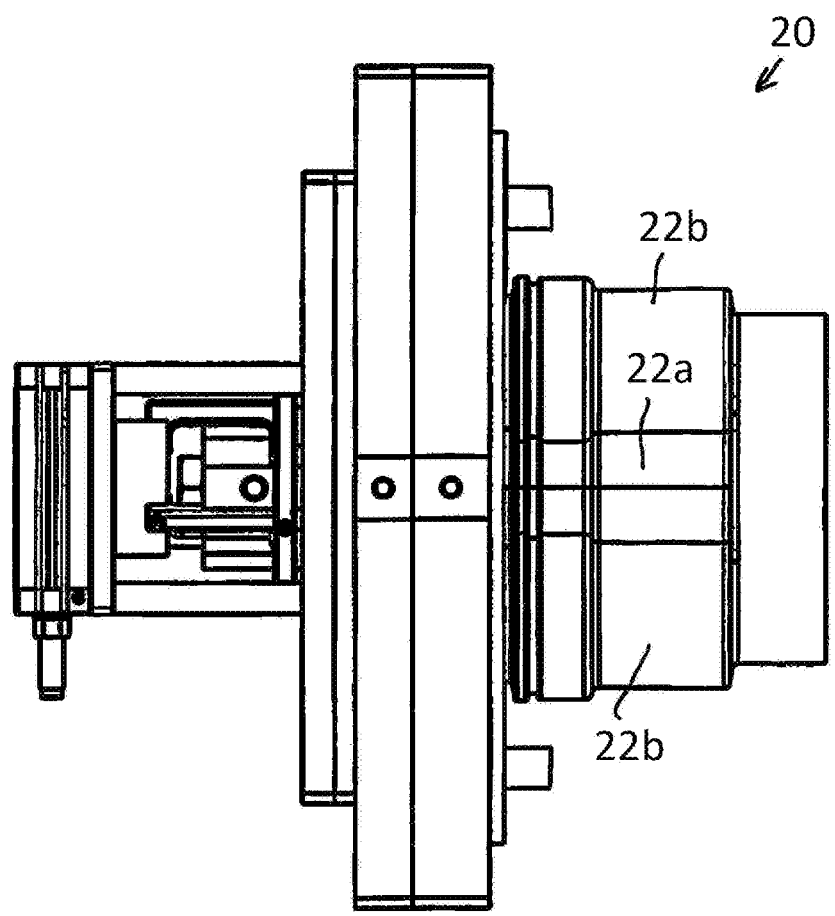
FIG. 10 is a left side view of the core device of FIG. 1.
Figure 11:
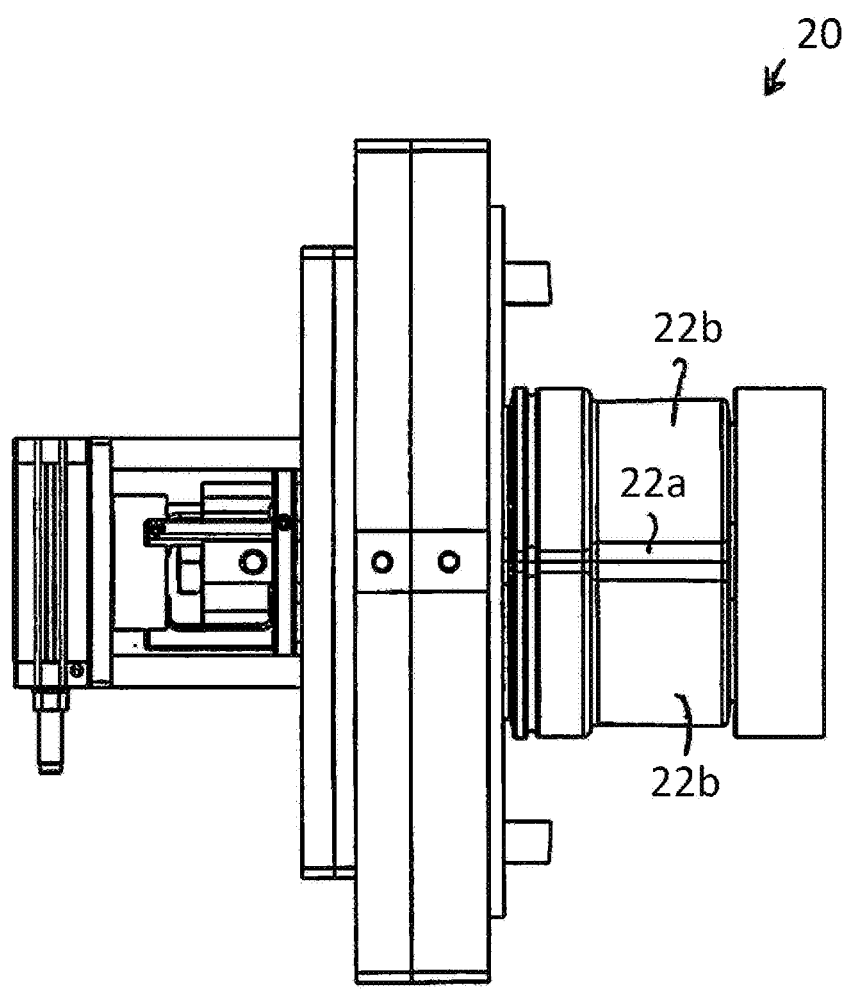
FIG. 11 is a left side view of the core device of FIG. 1 in a collapsed mode.

FIG. 1 shows core device 20 in an injection mode with outer wall components 22 fully extended to form the outer wall structure of core device 20. The outer wall structure of core device 20 is used to form an inner wall structure of article 58. Components 22 include a plurality of vent or steam ports 23 configured to allow steam to escape from within core 20 in order to heat and react with foam particles injected into tool 30. When the injection and heating process is completed, water is introduced to core device 20 for cooling. Once cooled, device 20 is collapsed as shown in FIG. 9 so that device 20 may be extracted from the newly formed foam article 58. Particularly, the components 22 of device 20 collapse and sliding mechanism 34 activated to retract device 20 from the forming cavity within tool 30. As shown in FIG. 9, components 22 are nested and collapsed to form a relatively small profile. Device 20 includes a plurality of wall components 22. In one aspect device 20 includes a first set of wall components 22a and a second set of wall components 22b. The components 22a are smaller compared to components 22b and are configured to nest internally of components 22b in the collapsed mode as shown. Components 22 are configured to form a unitary outer wall of core device 20 for use in the injection molding process. Components 22 are configured to travel inward or centripetally toward an internal rotatable shaft as described below. FIG. 10 is a side view of device 20 in a natural uncollapsed mode with outer wall components 22 fully extended. FIG. 11 is a side view of device 20 in a collapsed mode with outer wall components 22 retracted.

As described herein, device 20 includes means 60 for moving the wall components 22 from an expanded mode as shown in FIG. 1 to a collapsed mode as shown in FIG. 9. Means 60 operate in conjunction with rotatable shaft 24 which shaft is configured to rotate about fixed shaft 28. Fixed shaft 28 is mounted to a backside side of main core back plate 36 and extends outward from a front side of main core front plate 37 (See FIG. 12). A shoulder 29 is connected to fixed shaft 28 at a terminal end of shaft 28. Shoulder 29 includes lobes 31 (FIG. 20) which define slot receiver ports 33. In one aspect shoulder 29 is fastened to fixed shaft 28 via fasteners. Fixed shaft 28 and shoulder 29 provide a stable structure upon which moving means 60 may activate to adjust the wall components 22.

In one aspect, moving means 60 are provided for moving the outer wall components 22 toward the rotatable shaft 24 upon rotation of the shaft 24. In one example, moving means 60 includes a first member or a first disk 40 and a second member or a second disk 50. First disk 40 has a plurality of non-linear or substantially non-linear slots 42. In one aspect first disk 40 includes multiple slots 42a, 42b. Slots 42a include a set of slots which have a variable curve path. In one aspect, the variable curve varies throughout the entire length of the slot 42. In other aspects the curve of slot 42 will vary throughout at least a portion of the entire length of the slot 42. In one aspect, slots 42a comprise a set of slots having a slot path which is different compared to the slot paths of the set of slots 42b. (See FIG. 13). In one aspect, set of slots 42a define a slot path having a greater inwardly projecting angle or path as compared to the set of slots 42b which have a lesser inward angular orientation. More particularly, with reference to FIG. 13, slot 42a has a path with an orientation projecting toward the center shaft more severely than a path associated with slot 42b. The path associated with slot 42b follows more closely to the outer perimeter of disk 40 before gradually angling toward the center of disk 40, while the path associated with slot 42a follows a path which is more direct toward the center of disk 40. In one aspect the lengths of the respective sets of slots 42a, 42b are equal, while the path angles are different. Such differences in path orientation allow for individual or respective wall components 22 to travel centripetally at different rates as described further herein. In one instance, a slot 42a having a more severe slope or inward angle will cause pins 26 to travel inward at a greater rate compared to pins 26 positioned within slots 42b having a less severe slope or inwardly extending angle.

Each wall component 22 includes a connected dowel or pin 26. Each pin 26 in turn is positioned within a respective slot 42a, 42b of disk 40. Each pin 26 is also positioned within a respective slot 44 of a second disk 50 (or within a respective slot 44 defined in main core front plate 37 at a drive-side of device 20). Accordingly, movements of respective pins 26 within respective slots 42, 44 cause respective wall components 22 to move centripetally and/or centrifugally. The respective slots 42, 44 are configured with paths to control and coordinate a timed or sequenced travel of the wall components 22. Some paths are configured as noted herein to cause some respective wall components, namely 22a in one example, to move centripetally at a rate that is greater than other respective wall components such as components 22b. Such different rates of travel allow different components 22 to be collapsed at different rates for desired operation.

Figure 19:
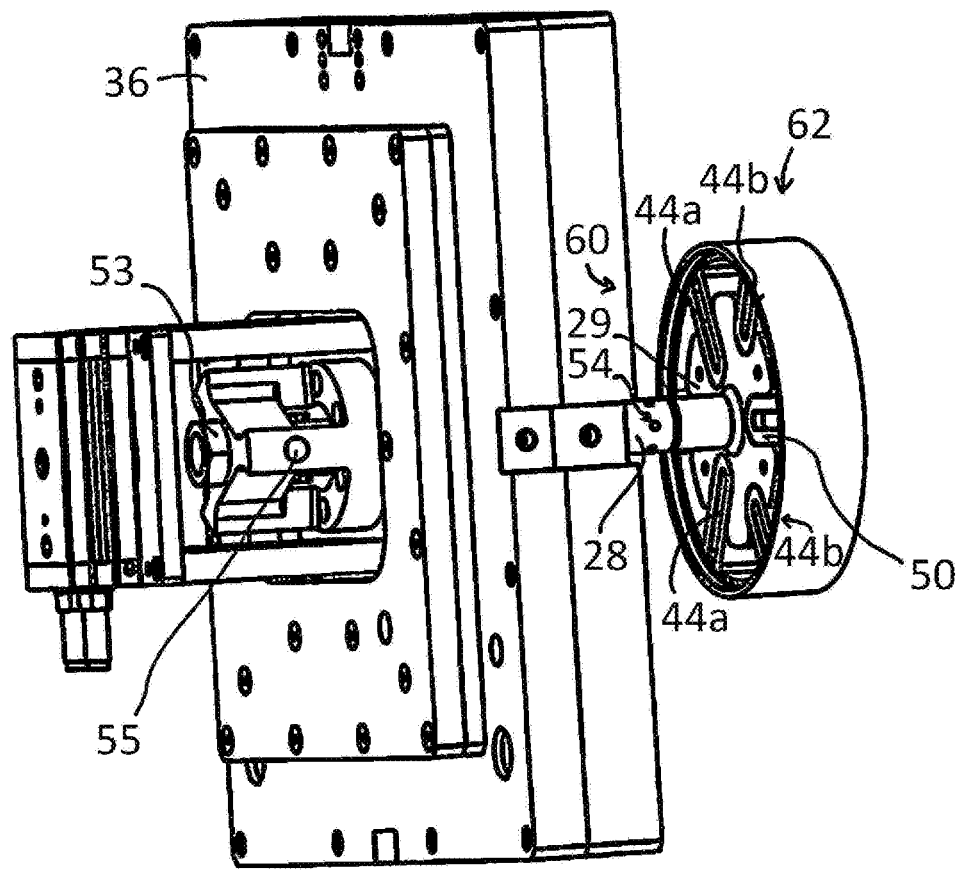
FIG. 19 is a perspective view of FIG. 1 with components removed for clarity.

FIG. 19 shows one aspect of a second disk 50 having second slots 44. Slots 44 are generally linear and in some examples are linear, i.e., the slot paths have a linear orientation. Some of the sets of slots 44a have a longer slot length compared to others of the set of slots 44b. The longer length slots 44a allow pins 26 to translate a greater distance from the perimeter of disk 50 toward the rotatable shaft 24 (or toward the fixed shaft 28). In turn, the outer wall components 22a which utilize pins 26 positioned within slots 44a will collapse closer to rotatable shaft 24 as compared to wall components 22b which, while also collapsing linearly toward rotatable shaft 24 travel a lesser distance. The means 60 for moving the wall components 22, which includes first disk 40 and second disk 50, allow for some of the wall components 24a to nest underneath wall components 24b. Due to the angular path caused by first slots 42a, the wall components 22a move sharply toward the rotatable shaft 24 and at such a rate so as to provide clearance for the wall components 22b to collapse and draw closer together (i.e., components 22b, 22b, as in FIG. 9, draw close together with wall component 22a nested beneath components 22b, 22b). The paths of slots 42a, 42b are configured such that an efficient collapse is achieved without interference due to wall components 22 abutting against one another.

In further reference to FIG. 19, second disk 50 in one aspect is integrally connected with cap 62. Second disk 50 includes second set of slots 44 which are spaced apart and project linearly toward fixed shaft 28. Disk 50 is engaged with shoulder 29 with respective slots 42 positioned within slot receiver ports 33 between lobes 31 (See FIG. 20). In such configuration disk 50 is connected to fixed shaft 28 such that slots 42 are rigidly disposed to resist angular movement of pins 26.

Figure 13:
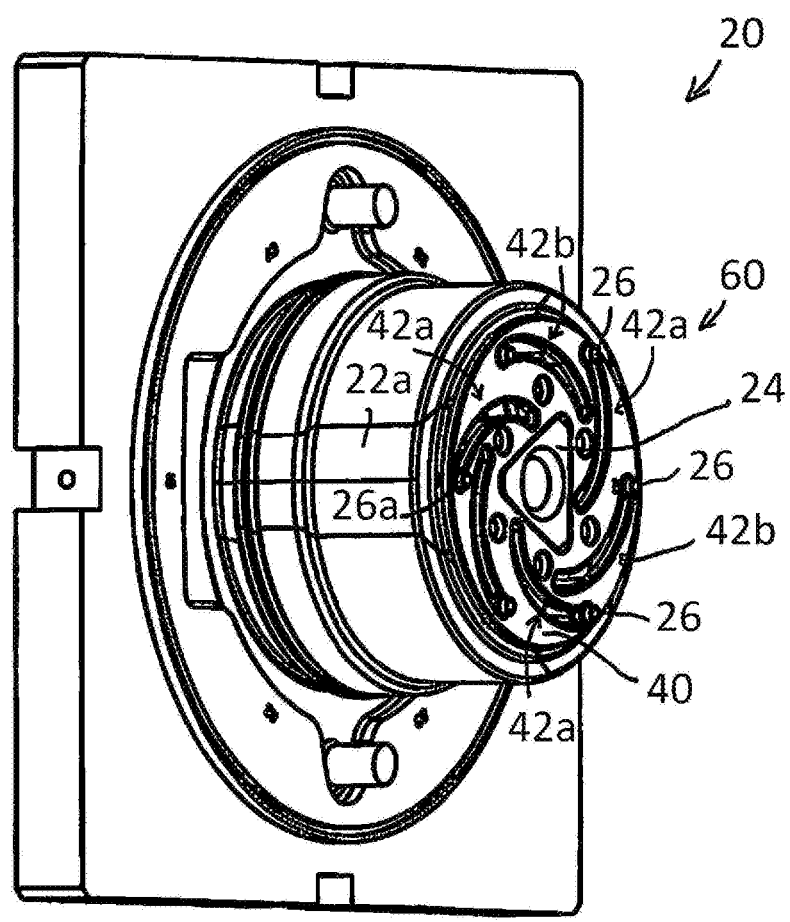
FIG. 13 is a perspective view of the core device of FIG. 1 with components removed for clarity.
Figure 14:
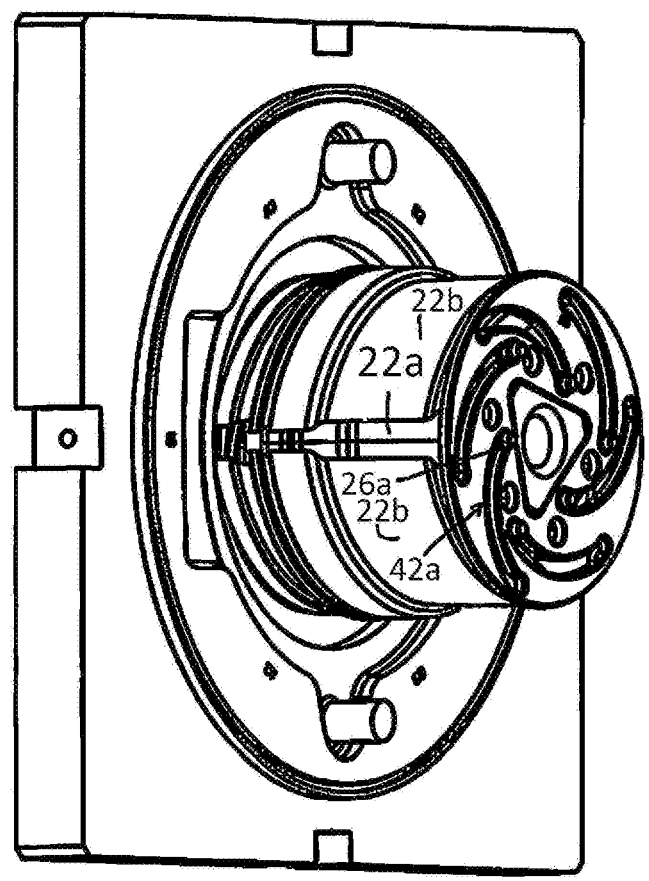
FIG. 14 is a perspective view of the core device of FIG. 1 in a collapsed mode with components removed for clarity.

In an assembly aspect, first disk 40 is connected to rotatable shaft 24 with pins 26 projecting from wall components 22 through slots 42. The pins 26 are connected to respective wall components. Cap 62, containing disk 50, is secured to shoulder 29 and adjacent to and outward of disk 40. In one aspect disk 50 abuts disk 40. The pins 26 projecting through slots 42 extend into slots 44. Thus, when rotatable shaft 24 is rotated, pins 26 follow respective slots 42, 44, causing the pin to move linearly down path 44 toward shaft 28 and at a rate of travel dictated by the angle of the path defined by slot 42. For instance, the cap 62 shown in FIG. 19, when positioned over the disk 40 presented in FIG. 13, will receive the pins 26 in respective slots 44. A pin 26a associated with a wall component 22a (See FIG. 13) and positioned within slot 42a of disk 40 travels linearly toward rotatable shaft 24. FIG. 14 shows pin 26a positioned inwardly at a collapsed mode compared to the positioning of pin 26a at expanded mode in FIG. 13. Pin 26a is urged linearly due to the pin 26a sliding within linear slot 44a within stationary disk 50. As disk 40 is rotated counterclockwise with reference to FIG. 13, slot 42a also rotates counterclockwise resulting in pin 26a sliding linearly inward. Likewise, the respective pins 42 contained within respective slots 42, 44, also travel centripetally thus causing collapse of core device 20. Reversing the motion of rotatable shaft 24 with clockwise rotation causes the pins 26 to travel radially outward (centrifugally), returning the respective wall components 22 to the original injection mode as shown in FIG. 13. The path angles of slots 42 may be configured to cause wall components 22 to travel at different rates according to a desired application and taking into account the sizes and thicknesses of wall components 22 to provide for desired nesting without abutting of adjacent components 22.

In one aspect first disk 40 has a triangular center configured to engage with a like triangular outer shape of rotatable shaft 24. Such triangular arrangement provides rigid connection of disk 40 to shaft 24. Shaft 24 includes a central longitudinal bore which receives the fixed shaft 28. Shaft 24 rotates about fixed shaft 28.

Figure 15:
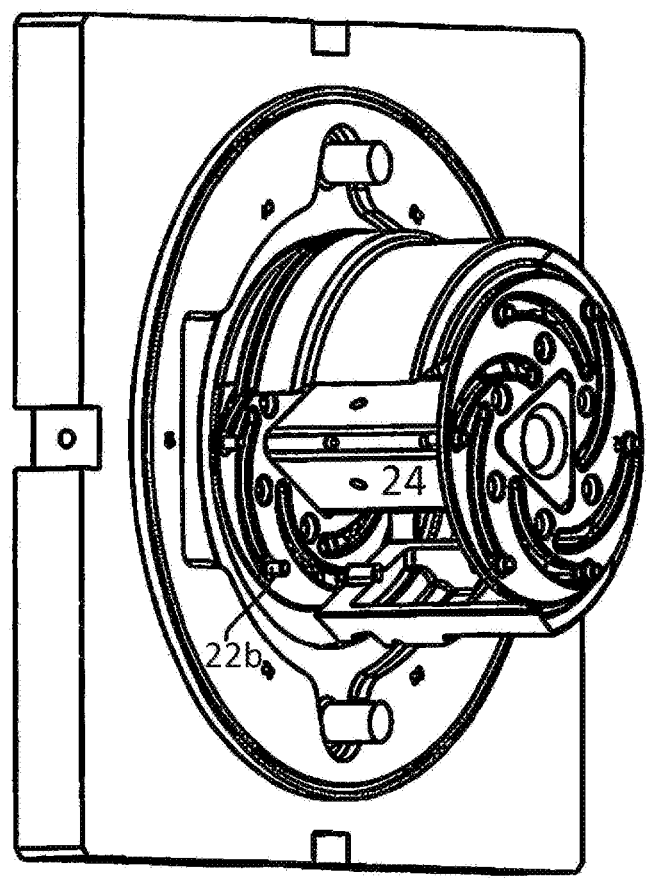
FIG. 15 is a perspective view of the device of FIG. 13 with components removed for clarity.
Figure 16:
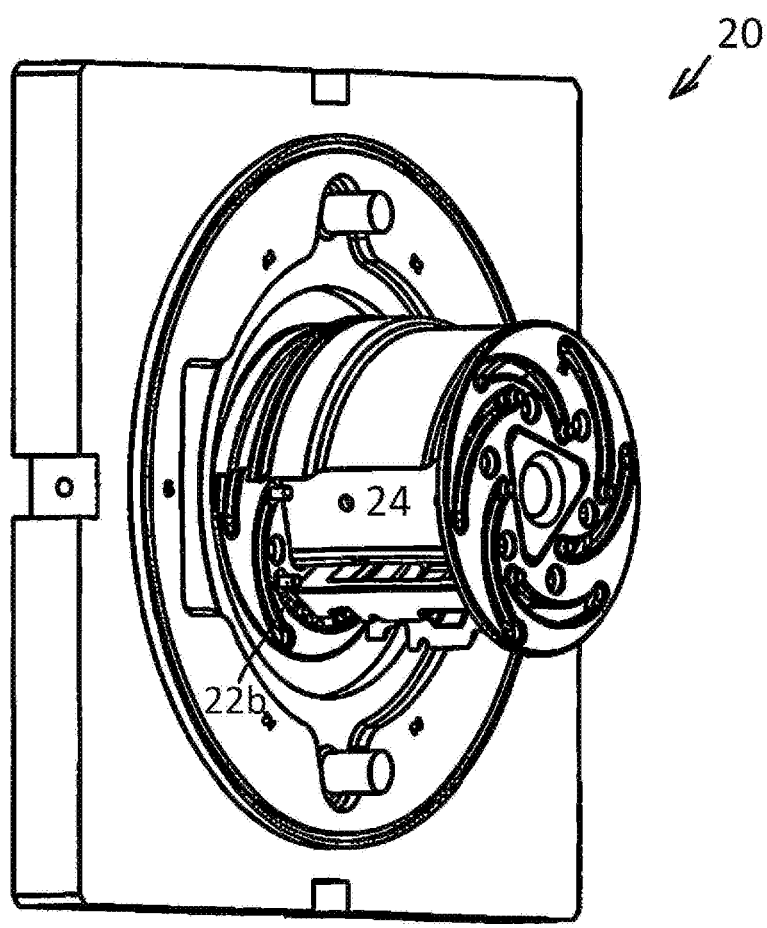
FIG. 16 is a perspective view of the device of FIG. 14 with components removed for clarity.

FIG. 15 and FIG. 16 show device 20 with a wall component 22a and wall component 22b removed for clarity. When shaft 24 is rotated, pin 22b moves internally toward shaft 24 as shown in FIG. 16. The wall component 22b that would be connected to pin 26b will likewise collapse internally.

Figure 17:
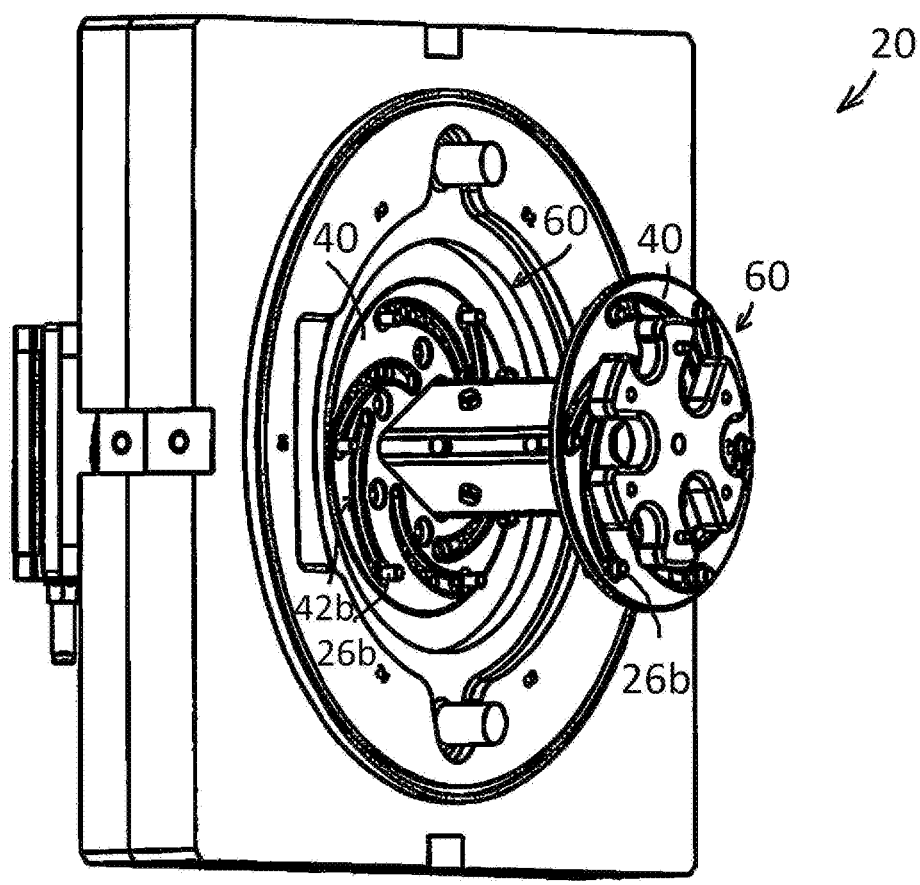
FIG. 17 is perspective view of the device of FIG. 1 with components removed for clarity.
Figure 18:
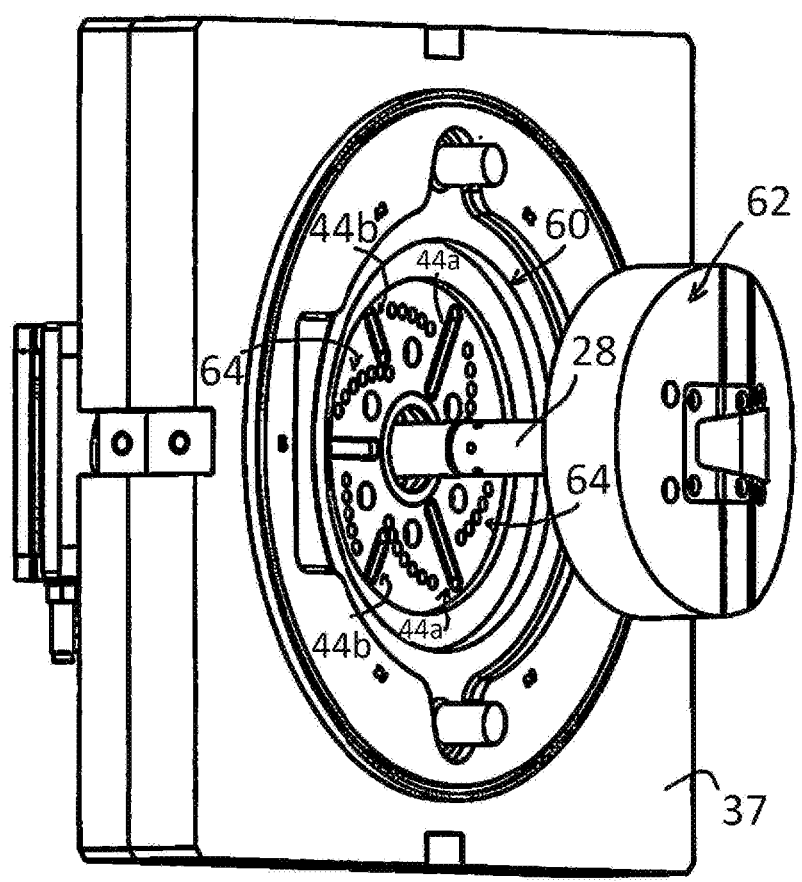
FIG. 18 is a perspective view of FIG. 1 with components removed for clarity.

With respect to FIG. 17 and FIG. 18, slots 44 are provided in main core front plate 37. In one aspect plate 37 defines slots 44. A pin 26b, for instance, is positioned within slot 44b. Such pin is also positioned through slot 42b of a second disk 40 positioned adjacent plate 37. Second disk 40 has slots which are configured the same as slots 42 of first disk 40 positioned outwardly. Pin 26b is connected to a wall component 22b. Disk 40 is connected to rotatable shaft 24 such that rotation of shaft 24 causes translation of the pins 26 as was referenced previously. In one aspect, each wall component 22 includes a pin 26 positioned within first disk 40 and another pin 26 positioned within second disk 40 so that uniform action on each end of a component 22 is realized for smooth collapse (see for instance, wall component 22b in FIG. 20; the second disk 40 is removed from the device in FIG. 20 for clarity, showing pin 26b contained within slot 44b).

Referring to FIG. 18, slot 44b has a length less than linear slots 44a. This is because pin 24b travels a shorter distance during the collapse of components 22b, whereas the components 24a travel inward a greater distance toward shaft 24 to accommodate for the referenced nesting and collapse.

Figure 21:
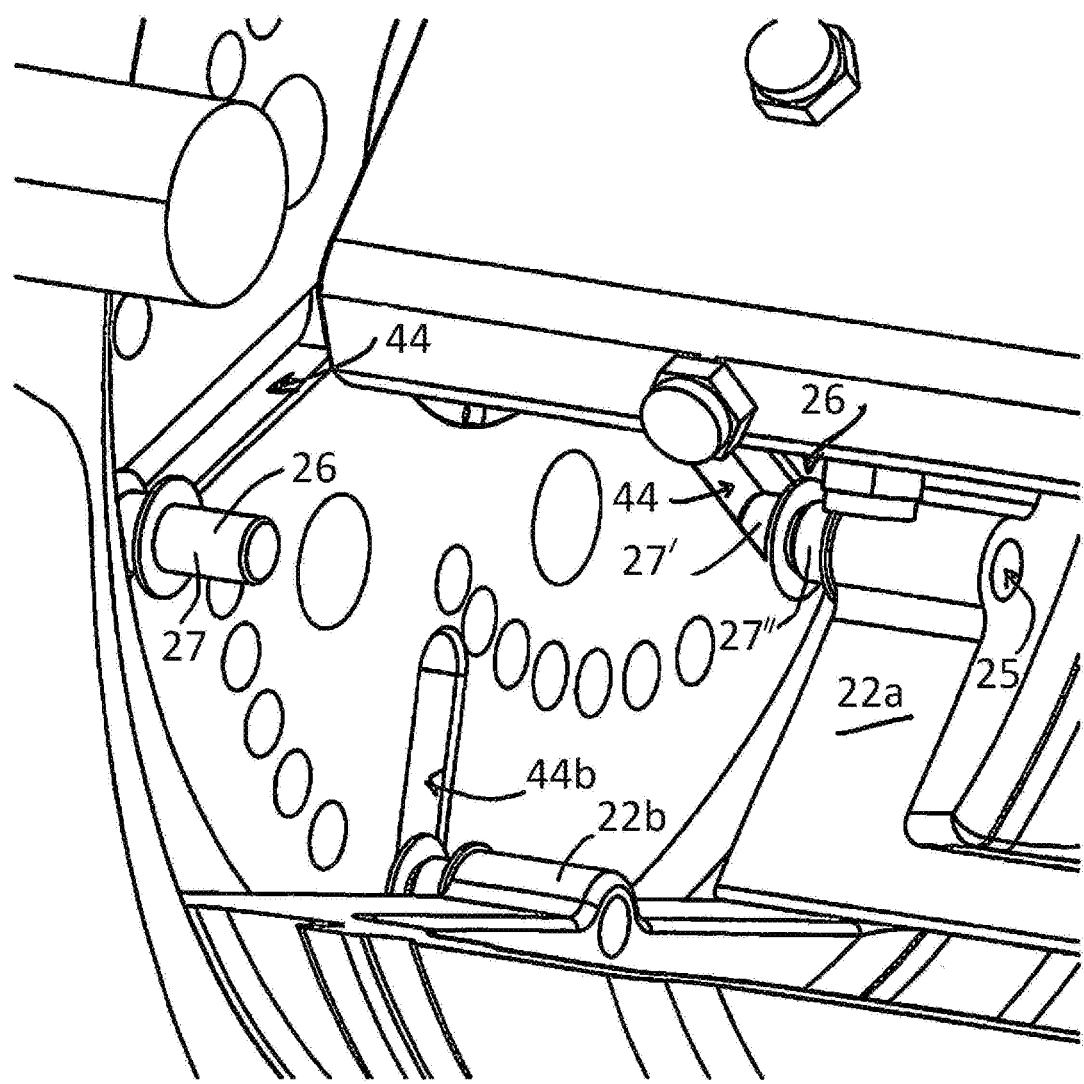
FIG. 21 is an enhanced partial perspective view of the device of FIG. 1 with components removed for clarity.
Figure 22:
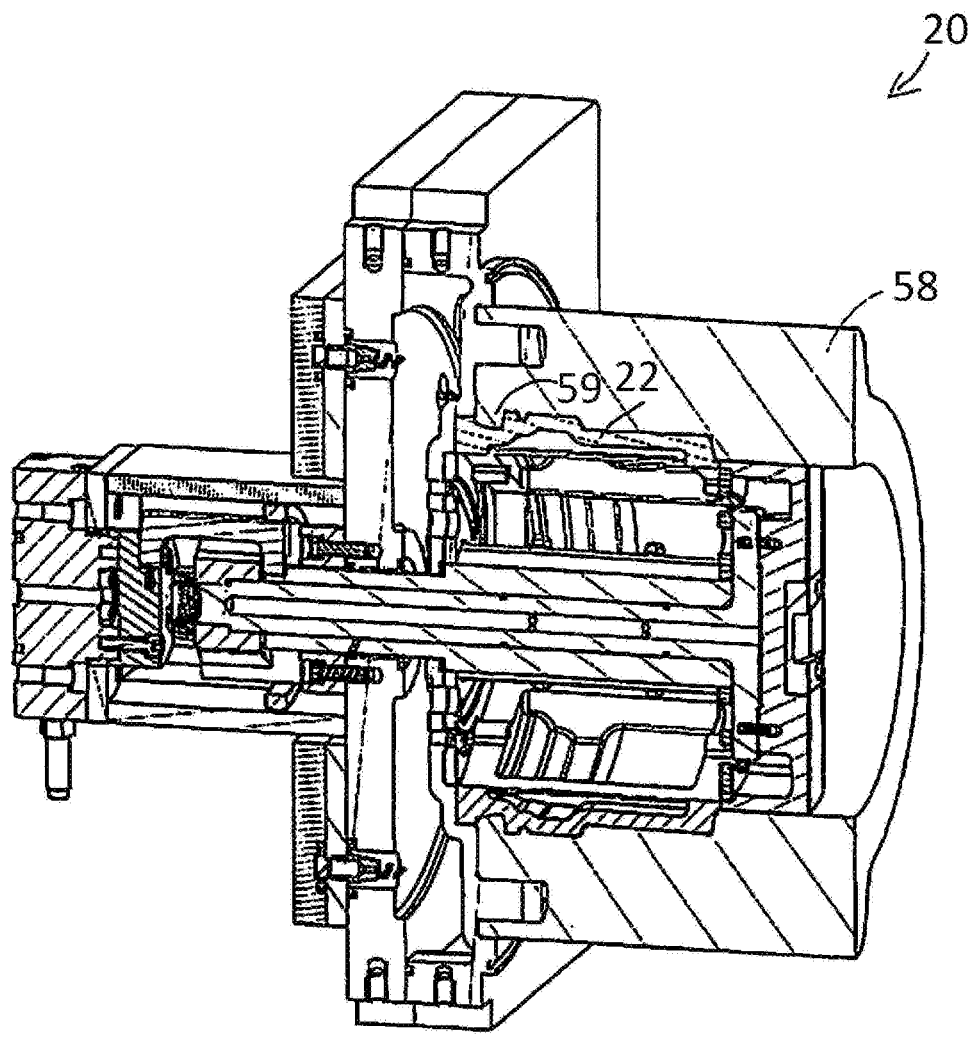
FIG. 22 is a section view of the core device of FIG. 1 and depicting a representative foam article surrounding the core device.

FIG. 21 shows a pin 26, which connects to component 22a, and is positioned within slot 44. In one aspect, pin 26 inserts into a pin cavity 25 formed in component 22a. Pin 26 may be threaded into pin cavity 25, for instance. Pin 26 in one aspect is made of metal and includes a pair of flange bushings 27. In one aspect, pin 26 includes a bushing 27' which slides within slot 44, while bushing 27" is a bushing which slides within slot 42 of disk 40 (disk 40 is removed from FIG. 21 for clarity). The bushing 27 may be a unitary component having a flange separating bushings 27' and 27". In one aspect bushing 27 is secured onto pin 26, and in other aspects pin 26 is manufactured with integrally connected bushings 27. A bushing 27 may be inserted onto pin 26. In one aspect bushing 27 is made of material to allow for low friction between pin 26 and edges of the slots within disks 40, front plate 37 and disk 50. For instance, to allow ease of sliding of pins 26 within the various slots, a cap or bushing 27 is placed on the pin 26 (or the pin is made with low friction materials). In one aspect a plastic or polymer bushing 27 is used to achieve a low friction status so that the pins may slide efficiently.

Applicants have recognized that bushings 27 may crack or warp or flatten due to high pressures and temperatures of the application. Also, there is substantial force applied to the pins 26 and bushings 27 due to the cross-structure or overlap of the slots. For instance, each pin 26 inserts into both a linear slot 44 and into a curved slot 42a or 42b. There is a "scissors-like" effect or force placed on the bushings 27 at these locations, causing wear. This effect also results in a "sticking" of the pins (or tendency to "stick") and a relatively great force needed to overcome this sticking condition. A bushing 27 may also flatten, warp or crush due to the forces. The forces may be especially strong at the end locations or end points of the slots 42, 44. For instance, in the fully expanded mode, the pins 26 and bushings 27 are positioned at the outer locations of the respective slots 42, 44. To initiate motion of the pins due to rotation of the shaft requires a relatively high force to overcome the "sticking" tendency. Once the pins start to travel along the slots 42, 44, the motion is comparatively smooth. Typically a sharp or greater force is needed to initiate motion of the pins along the slots or to overcome the "sticking". To assist in providing less friction and to allow the pins to move efficiently, in one aspect bushings 27 (and bushings 27', 27") are made of plastic, and in further aspects a bronze bushing is utilized. Such materials have less friction when in contact with the metal disks, for instance, and reduce the "sticking" or tendency to stick and provide longer life for the bushings and pins. In a further aspects, bushings 27 are made specialized materials, including electroless nickel-PTFE (EN-PTFE). EN-PTFE is a hard, uniform, self-lubricating coating. In the present application the bushings 27 and/or pins include the EN-PTFE coating (sometimes using a Teflon brand material) for low friction wear plating of the pins. In further alternatives bushings 27 and pins 26 may include or comprise a cadmium-plated bushings.

Figure 23:
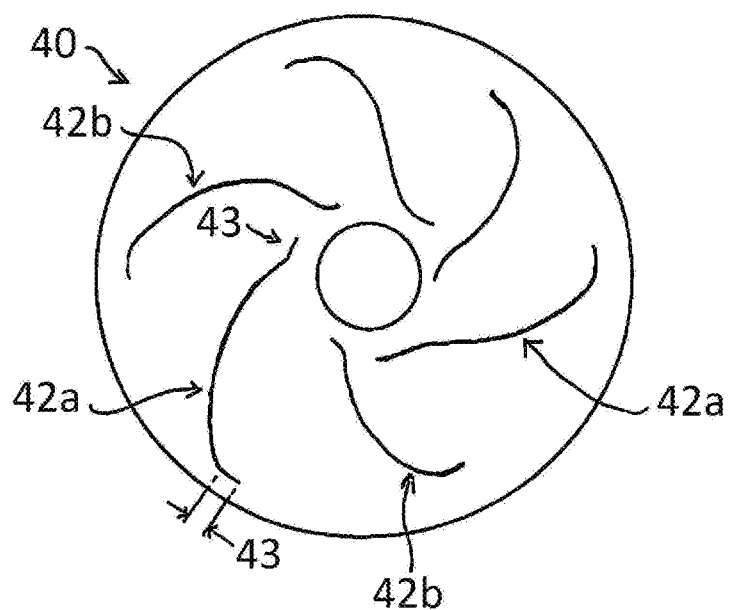
FIG. 23 is a plan view of an alternative disk component for use with the device of FIG. 1.
Figure 24:
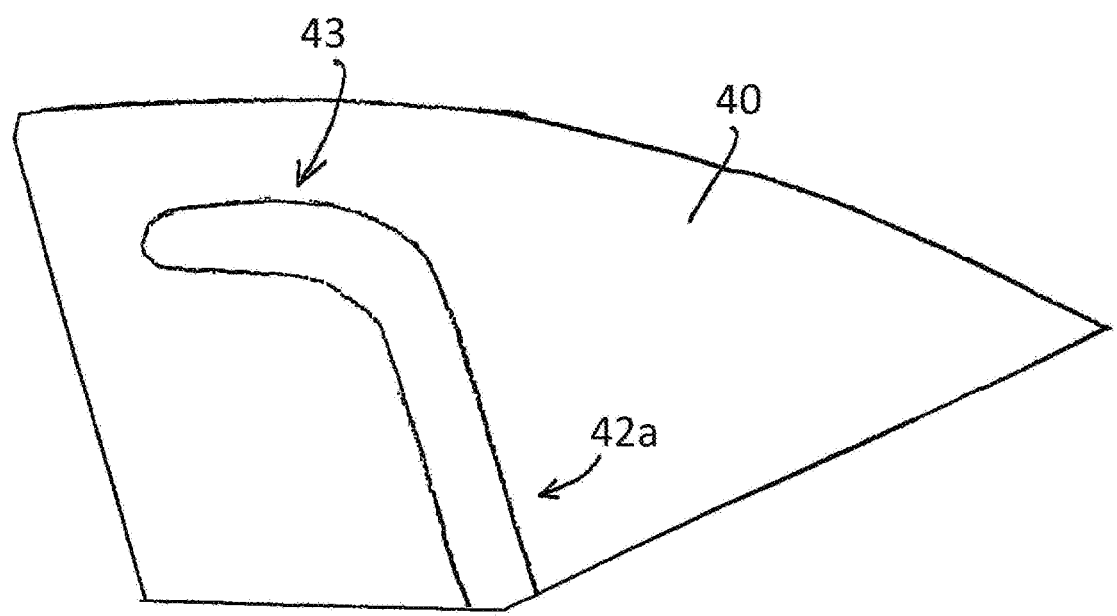
FIG. 24 is a partial plan view of an alternative disk component for use with the device of FIG. 1.

In addition to use of low-friction materials for pins 26 and/or bushings 27, the geometries of the slots 42a, 42b (and even 44) may be configured to achieve a more efficient operation. For instance, with respect to FIG. 23, slots 42 may include a path having a varying slope or curve. In one aspect, the outer end portion 43 of slot 42a, for instance, comprises a path which travels along an arc corresponding to an arc of the disk 40. In other words, the slot portion 43 does not travel closer to the center of disk 40. Thus, a pin 26 inserted within portion 43 receives little or no radial force (i.e., the pin 26 will not be forced inward/outward). Such "flat" slot portions 43 may be included at some or all of the slots 42a, 42b. These flat portions allow for a relatively easy rotation of disk 40 in order to minimize or alleviate a sticking condition as noted above. FIG. 24 shows a partial close-up plan view of a disk 40 having slot 42a having a flat slot portion 43. Slot portion 43 may span a short length or longer length as desired. The slot 42a in one aspect has a relatively sharp curve or turn at the end of slot portion 43 which causes pin 26 (and a corresponding component 22a) to move toward the center of disk 40 to collapse the component 22a. The angle of curve and overall path of the curve and slot 42a is configured to cause component 22a to collapse at a desired rate and to avoid contact with adjacent components 22b. The slot 42b includes a path and curves different compared to the slot 42a so that component 22b travels at a different rate compared to component 22a. In some instances the slots 42a, 42b are configured with portions of their paths so that components 22a, 22b travel at the same rates, and other portions of their paths so the components travel at different rates. As shown in FIG. 23, an end portion of slot 42a closer toward the center of disk 40 also has a flat slot portion 43 where little or no inward or outward travel is imparted on pin 26. In this manner slot 42a has a somewhat "S" curve shape.

Figure 25:
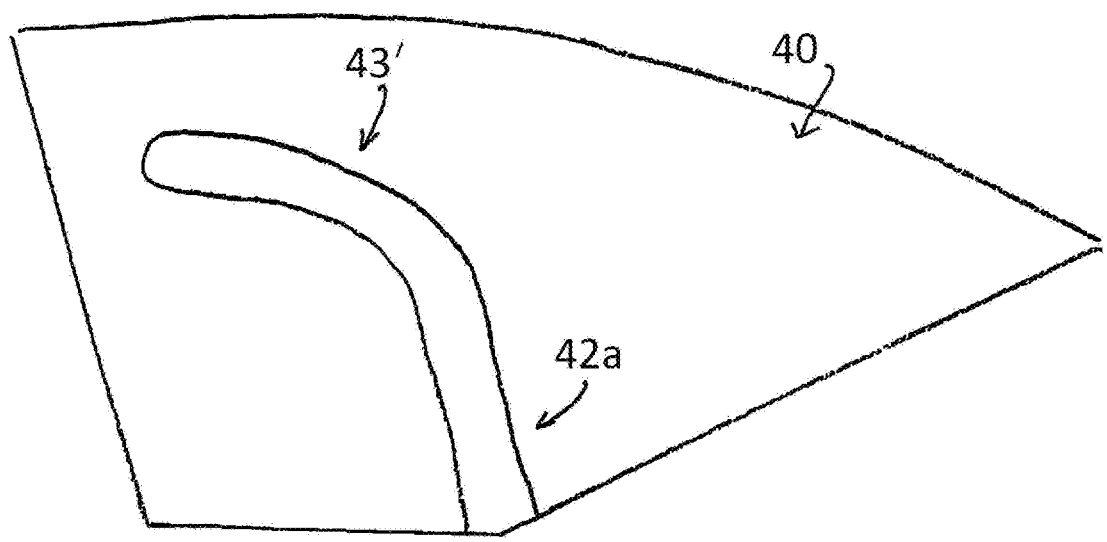
FIG. 25 is a partial plan view of an alternative disk component for use with the device of FIG. 1.

FIG. 25 is a partial plan view of disk 40 having an alternative pattern for slot 42a. In this view slot 42a has a gradually sloping slot portion 43'. This allows for some inward motion of pin 26 upon rotation of disk 40. The slope of slot portion 43' may vary along its length and may commence at different angles as desired. Several different path orientations may be used depending on the desired application, thicknesses of components 22, desired rate of travel, nature of materials, etc.

Figure 26:
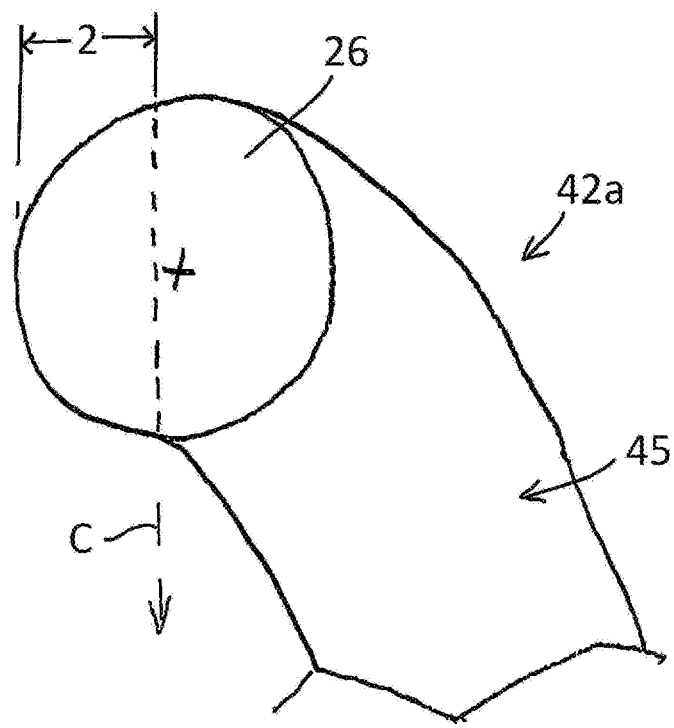
FIG. 26 is a partial plan view of an alternative disk component for use with the device of FIG. 1.

FIG. 26 is a partial plan view of a slot 42a defining a path 45 in which pin 26 (or a bushing 27 of pin 26) is positioned. Pin 26 is shown positioned at a terminal end of path 45. In one aspect, the terminal end portion of path 45 is configured (and a center "x" of pin 26 is positioned) such that distance "Z" is less than the radius of pin 26. Arrow C, which in part defines distance Z, intersects with a center of disk 40. This configuration result in immediate movement of pin 26 inward upon rotation of disk 40. In alternatives where distance Z is spans to a position beyond radius "x" of pin 26, rotation of disk 40 will result in little or no motion of pin 26 toward the center of disk 40. The distance Z may be varied as desired depending on the application. In further alternatives, the width of path 45 may also vary throughout the distance of slot 42a.

In a further aspect to reduce sticking or otherwise improve operation of pins 26 sliding within slots 42, 44, a vibrator such as a pneumatic vibrator is affixed to device 20. FIG. 7 and FIG. 8 depict a representative pneumatic vibrator 72 mounted to a surface of sliding mechanism 34. During the retraction and/or extension cycles (i.e., insertion or retraction of device 20 into the tool 30) vibrator 72 is activated to cause a vibration of the device. Such vibration causes pins 26 to move or alter forces applied to the pins 26 so they may unstick or otherwise freely slide within slots. The vibration assist in freeing the components 22 during a collapse and/or expansion action. An air supply is connected in one aspect to vibrator 72 to operate the vibration action.

As shown in FIG. 1, component 22a has outer edges 21, 21 which abut with components 22b, 22b, the outer edges 21, 21 being angled in one aspect such that the outer edges 21, 21 of component 22a lay partially beneath the outer edges of components 22b, 22b. Such angled outer edges 21, 21, allow component 22a to travel inward prior to inward travel of components 22b. Such angles outer edges 21, 21 also allow for components 22 to form a solid outer wall structure. Components 22 may form a generally cylindrical structure or other form of structure as desired to form an interior wall or segment of an article 58.

Figure 12:
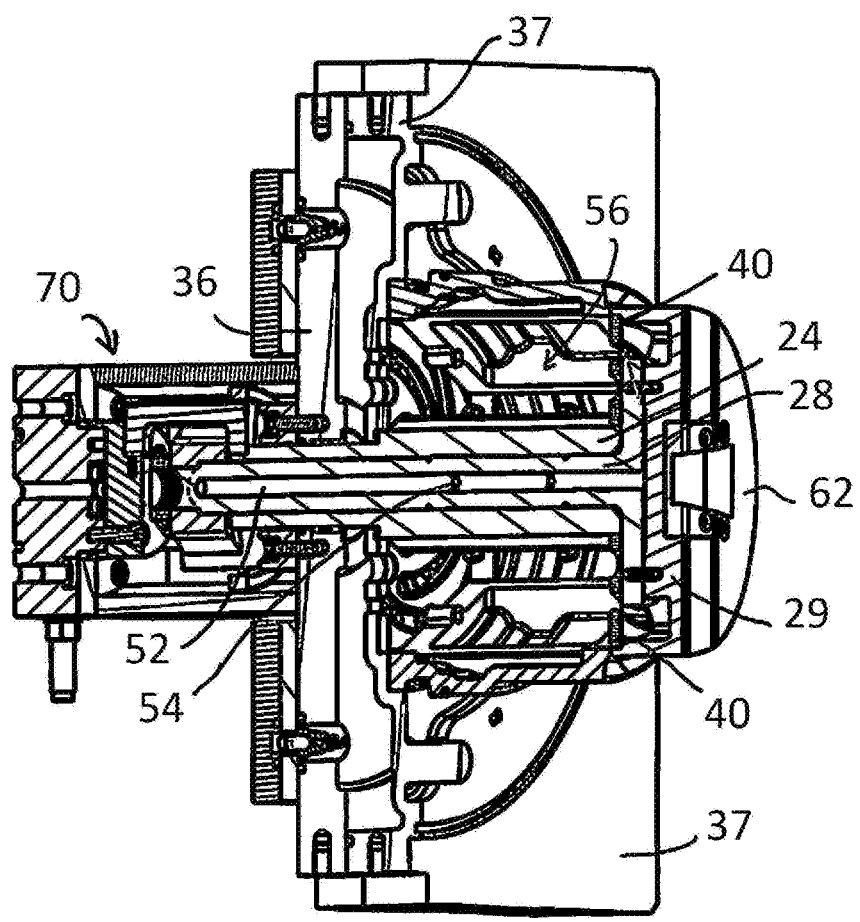
FIG. 12 is a section view of the core device taken along line 12-12 of FIG. 1.
Figure 20:
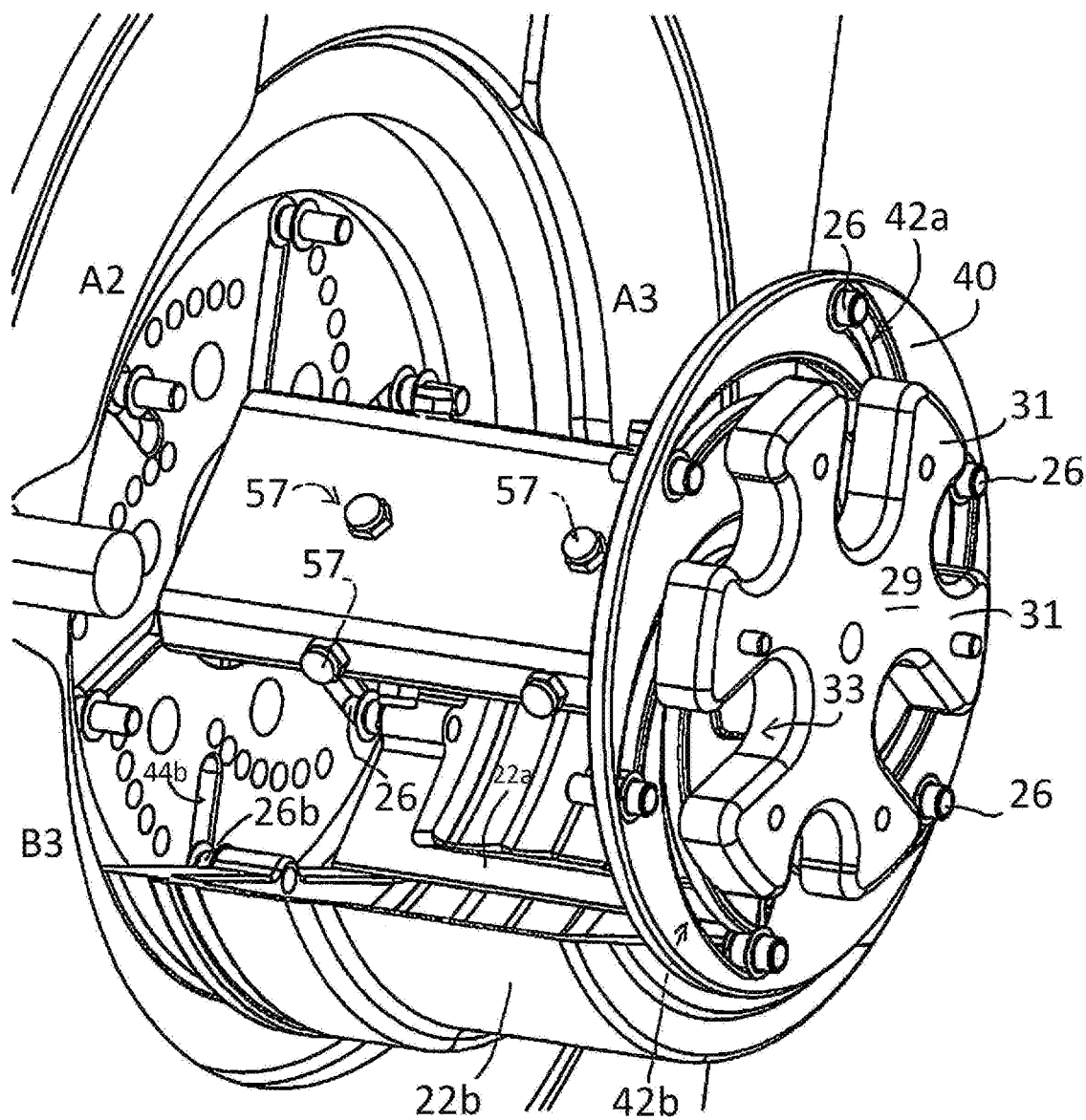
FIG. 20 is an enhanced partial perspective view of the device of FIG. 1 with components removed for clarity.

In further reference to FIG. 12 fixed shaft 28 includes a hollow center path 52 configured to receive a coolant, and exit ports 54 configured to release the coolant into a cavity 56 defined by the wall components 22. The coolant such as water is used to cool the formed article 58 and core device 20 to cure the article 58 upon injection molding. A clearance hole 55 (FIG. 19) is used to provide a threaded shaft into the fixed shaft 28 to supply water or coolant. Exit ports 54 are configured to align with additional ports within rotating shaft 24 to supply water to cavity 56. Particularly, shaft 24 includes receiving ports that when shaft 24 is in a neutral injection molding position, align with exit ports 54 to receive water to be dispersed via spray nozzles 57 (FIG. 20).

Various seals are also provided. Hollow path 52 is also configured to supply water to cap 62 where the water circulates about cap and shoulder and second disk 50 for additional cooling as desired. Fixed shaft 28 is fixedly secured to main core back plat 36 by fasteners. A nut 53 is used in one aspect to secure shaft 28. A variety of steam ports 64 (FIG. 18) are provided to supply steam to the cavity 56 and to be delivered to the molding chamber via vent ports 23 (FIG. 1). An air or pneumatic drive 70 is utilized to drive rotatable shaft 24.

In a further alternative aspect, rotating disk 40 may include linear or relatively straight slots 44 while disk 50, which is a fixed disk, includes the variable or curved slots 42 for receiving pins 26. A pin 26 travels within slots of a rotating disk and simultaneously within slots of a fixed disk.

In further aspects the invention includes a method 100 for retracting a core device 20 of an injection molding tool 30 from a formed article utilizing the core device 20 as described. In one aspect the method 100 includes the step of rotating a central shaft 24 to centripetally move outer wall components 22 of the core device 20 toward the rotating shaft 24. Such motion allows components 22 to collapse so that core device 20 may be extracted from the resulting article of manufacture. In further aspects the invention includes a method of manufacturing an injection molded foam article 58 utilizing the core device 20.

It should be understood, of course, that the foregoing relates to exemplary embodiments of the invention and that modifications may be made without departing from the spirit and scope of the invention as set forth in the following claims.

We claim:

1. A collapsible core device for use in a foam injection molding process, the core device comprising:
   a rotatable shaft;
   at least one moveable outer wall component positioned radially from the rotatable shaft and configured to insert into an outer mold structure of a foam injection molding tool to create a molded foam article; and
   means for moving the at least one outer wall component toward the rotatable shaft upon rotation of the rotatable shaft, the means for moving including a first disk operatively engaged with the shaft and having at least a first slot, the at least a first slot configured to receive a pin connected to the at least one moveable outer wall component; where the means for moving further includes a second disk connected to a fixed center shaft, the second disk having at least a second slot configured to receive the pin, the rotatable shaft configured to rotate about the fixed center shaft.

2. The core device of claim 1 where the at least a first slot is at least in part a non-linear slot and the at least a second slot is a generally linear slot.

3. The core device of claim 1 where the means for moving further includes a third disk operatively engaged with the shaft and having at least a third slot configured to receive a second pin connected to the at least one moveable outer wall component, and a fixed core plate having at least a fourth slot configured to receive the second pin.

4. The device of claim 1 further comprising a first set of outer wall components positioned radially from the rotatable shaft and a second set of outer wall components positioned radially from the rotatable shaft, the first set of outer wall components configured to move toward the rotatable shaft at a rate that is faster than a rate at which the second set of outer wall components is configured to move toward the rotatable shaft upon rotation of the rotatable shaft.

5. The device of claim 4 further comprising means for moving the first set of outer wall components and the second set of outer wall components, the means for moving having a first set of slots with a first slope path and a second set of slots with a second slope path, a slope of the first slope path being greater than a slope of the second slope path.

6. The device of claim 1 further including another outer wall component positioned adjacent the at least first outer wall component, the means for moving configured such that the at least first outer wall component moves toward the rotatable shaft at a rate greater than a rate at which the another outer wall component moves toward the rotatable shaft.

7. A collapsible core device for use in a foam injection molding process, the core device comprising:
   a rotatable shaft;
   a first moveable outer wall component positioned radially from the rotatable shaft and configured to insert into an outer mold structure of a molding tool to create a molded article;
   a first member operatively engaged with the rotatable shaft and having at least a first slot, the at least a first slot configured to receive a first pin connected to the first moveable outer wall component;
   a second member secured in a fixed position and having at least a second slot configured to receive the first pin, the rotatable shaft configured to rotate such that rotation of the rotatable shaft causes the pin to slide within the at least a second slot toward the rotatable shaft and causing the first moveable outer wall component to move toward the rotatable shaft; and a third member comprising a disk operatively engaged with the rotatable shaft, the third disk having a third slot, the third slot configured to receive a third pin connected to the first moveable outer wall component at a drive side of the first moveable outer wall component opposite the first pin.

8. The collapsible core device of claim 7 having a core wall defining at least a fourth slot configured to receive the third pin, the fourth slot having a slot path having a generally linear orientation.

9. A collapsible core device for use in a foam injection molding process, the core device comprising:
   a rotatable shaft;
   a first moveable outer wall component positioned radially from the rotatable shaft and configured to insert into an outer mold structure of a molding tool to create a molded article;
   a first member operatively engaged with the rotatable shaft and having at least a first slot, the at least a first slot configured to receive a first pin connected to the first moveable outer wall component;
   a second member secured in a fixed position and having at least a second slot configured to receive the first pin, the rotatable shaft configured to rotate such that rotation of the rotatable shaft causes the pin to slide within the at least a second slot toward the rotatable shaft and causing the first moveable outer wall component to move toward the rotatable shaft; and further comprising a fixed center shaft about which the rotatable shaft is configured to rotate, the second member comprising a disk fixedly engaged with the fixed center shaft.

10. The collapsible core device of claim 9 where the fixed center shaft has a hollow center channel configured to receive a coolant and exit ports configured to release the coolant into a cavity defined by the wall components.

11. The collapsible core device of claim 9 where at least a portion of the at least a first slot is non-linear such that rotation of the rotating shaft at a constant rate causes the pin to slide within the at least a second slot and centripetally at a variable rate.

12. The collapsible core device of claim 9 having a second moveable outer wall component positioned adjacent the first moveable outer wall component, a second pin connected to the second moveable outer wall component, the first member comprising a disk having another slot configured to receive the second pin.

13. A method of collapsing the collapsible core device of claim 9, the method comprising:
   rotating a shaft to move the first moveable outer wall component toward the shaft.

14. The method of claim 13 where the core has at least two outer wall components, the step of rotating the shaft moves the at least two outer wall components toward the shaft at different rates.

15. The method of claim 13 where the core has six outer wall components, the step of rotating the shaft moves three of the six components toward the shaft at a first rate and three of the six components toward the shaft at a second rate.

16. The method of claim 13 where the at least one outer wall component includes a pin inserted into a slot of a rotatable member attached to the rotatable shaft, the slot configured with a path having a flat slot portion where travel therein by the pin results in little or no travel toward or away from a center of the rotatable member.

\* \* \* \* \*